Figure 1:
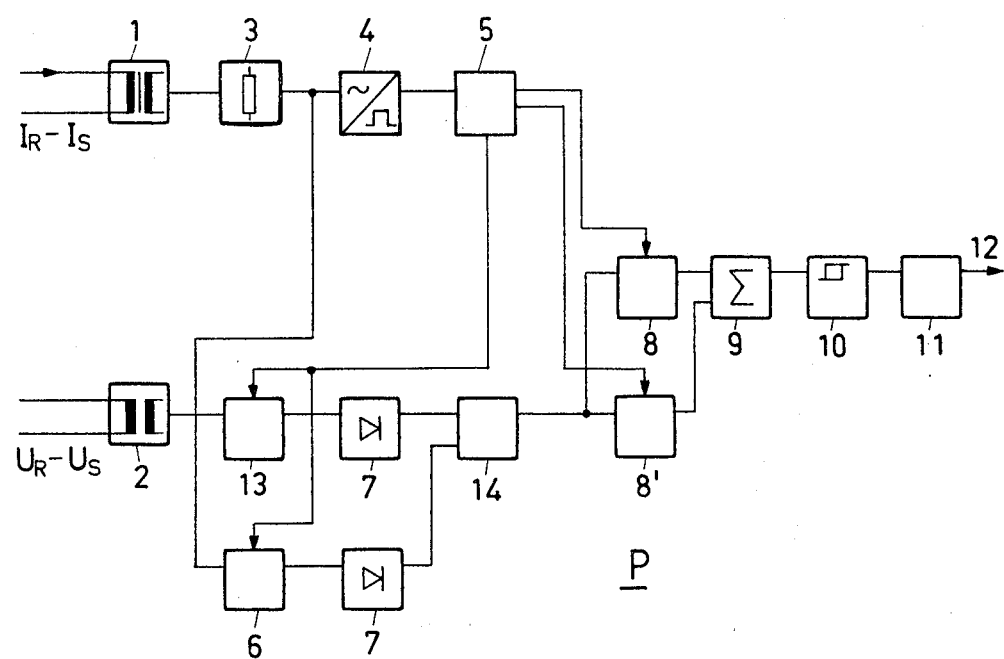

United States Patent [19]

Ilar et al.

[11] 4,426,670

[45] Jan. 17, 1984

[54] METHOD OF PROTECTION OF ELECTRICAL NETWORKS IN THE EVENT OF POWER TRANSIENTS BY MEANS OF A SURGE ARRESTER AND A SURGE ARRESTER FOR THE PERFORMANCE OF THE METHOD

[75] Inventors: Franc Ilar, Fislisbach; Fridolin Metzger, Möhlin, both of Switzerland

[73] Assignee: BBC Brown, Boveri & Company, Limited, Baden, Switzerland

[21] Appl. No.: 347,284

[22] Filed: Feb. 9, 1982

[30] Foreign Application Priority Data

Feb. 11, 1981 [CH] Switzerland ............................ 921/81

[51] Int. Cl.³ .............................................. H02H 3/40
[52] U.S. Cl. ........................................ 361/79; 361/42; 361/65
[58] Field of Search ............................ 361/42, 47–50, 361/65, 79, 80, 81, 84; 324/51; 328/132, 135; 364/482

[56] References Cited

U.S. PATENT DOCUMENTS

| 4,073,009 | 2/1978 | Andow et al. ................. 328/135 X |
| 4,187,525 | 2/1980 | Nagura et al. ...................... 361/42 |
| 4,209,741 | 6/1980 | Coby et al. ...................... 361/42 X |
| 4,377,833 | 3/1983 | Udren ................................. 361/79 |

FOREIGN PATENT DOCUMENTS 675515  7/1979  U.S.S.R. ............................... 361/80

*Primary Examiner*—Harry E. Moose, Jr.
*Attorney, Agent, or Firm*—Burns, Doane, Swecker & Mathis

[57] ABSTRACT

For the protection of electrical networks in the event of power transients, a surge arrester is employed which, independently of the value of the impedance at any time, continuously monitors and evaluates the change over time either of the measured impedance of the network or of the voltage multiplied by the cosine of the phase shift between current and voltage. Two parallel connected latch circuits store signals related to the current and voltage in the network. The difference between the signals stored in the two latch circuits is fed to a trigger circuit that controls a counter to emit a logic signal at the output terminal of the surge arrester only when the trigger circuit emits a logic signal twice in succession within a predetermined time. With this protection the electrical network is adequately protected against incorrect shutdown in the event of power transients in cooperation with any kind of short-circuit protective relay.

5 Claims, 2 Drawing Figures

METHOD OF PROTECTION OF ELECTRICAL NETWORKS IN THE EVENT OF POWER TRANSIENTS BY MEANS OF A SURGE ARRESTER AND A SURGE ARRESTER FOR THE PERFORMANCE OF THE METHOD

The present invention relates to a method of protection of electrical networks in the event of power transients by means of a surge arrester, and to a surge arrester for the performance of the method.

In the event of power transients dropping out of step in electrical networks it is necessary to ensure that not too many short-circuit protective relays, in particular distance relays, trip. In order to ensure this, surge arresters are employed. In "Selektivschutz" ("Selective Protection") by H. Neugebauer, Springer-Verlag, 1958, some surge arresters are described on pages 118 and 119. Thus, for example, one surge arrester is so designed that the difference between the response times of two impedance relays set at different values is evaluated as the measured criterion of power transients.

The disadvantage of this solution lies in the fact that the employment of this surge arrester is not possible if the operating impedance is nearly the same as the short-circuit impedance. This surge arrester cannot act independently of the shape of the operating characteristic of the protective equipment.

The object of the present invention is to eliminate the disadvantages of the prior art and to create a method of the kind mentioned above and a surge arrester for the performance of the method. The method can be used with any kind of short-circuit protective relay, in particular distance relays, where the surge arrester can work independently of the starting characteristic of the distance relay and can also be coordinated with an overcurrent response. The surge arrester must be able to automatically detect and evaluate the magnitude of the change of the impedance.

The advantages of the present invention are to be seen in the fact that a novel method and a surge arrester have been created which, in cooperation with any kind of short-circuit protective relay, adequately protect the electrical networks against incorrect trippings in the event of power transients. The power transients can be detected and evaluated every time within one and a half periods. The short-circuit protective relays can thereby be secured against incorrect trippings even at high frequencies.

The invention is explained in greater detail with the aid of two examples of the surge arrester, and further advantages of the invention are also mentioned.

Figure 2:
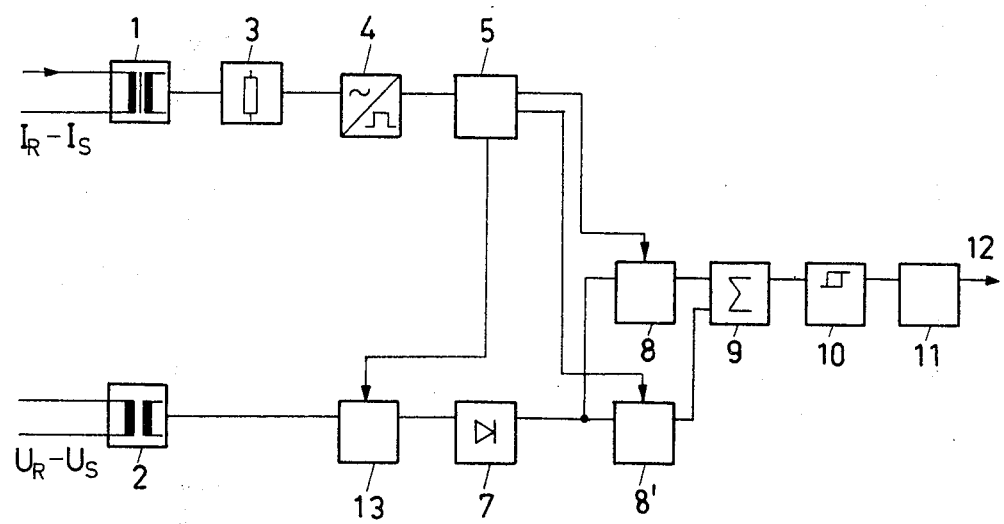

There is shown in:

FIG. 1—a first surge arrester in accordance with the invention by way of example, in which the change of the ohmic resistance with time is measured and evaluated; and FIG. 2—a second surge arrester in accordance with the invention by way of example, in which the change with time of the voltage, multiplied by the cosine of the phase shift between current and voltage, is employed.

In the embodiment of FIG. 1 the difference between two phase currents $I_R$-$I_S$ is supplied via a current transformer 1 to a shunt resistor 3. The current transformer 1 functions as an electrical isolator and the shunt resistor 3 produces a signal proportional to the current. This signal is converted in a square wave converter 4 into a square wave signal which is fed to the control device 5. This signal determines the intervals in time between the points at which the sinewave current signal passes through zero. To the shunt resistor 3 there is also connected an integrator 6 for the integration of the current signal. The difference between two phase voltages $U_R$-$U_S$ is supplied via a voltage transformer 2, which electrically isolate and matches the signal, to a second integrator 13 which is employed for the integration of the voltage signal. The two integrators 6, 13 are controlled by the control device 5 in such a way that the output from the first integrator 6 is an integral of the current signal between two points at which the current passes through zero, and the output from the second integrator 13 is an integral of the voltage signal between two points at which the current passes through zero. The two integrals are rectified in rectifiers 7 in order to only positive signals for further processing. The rectified integral of the current signal and the rectified integral of the voltage signal are fed to a divider 14 which divides the rectified integral of the voltage signal by the rectified integral of the current signal to form a signal that is proportional to the ohmic resistance. Through the action of the control device 5 the signal which arises at the output from the divider 14 after each passage of the current signal through zero is alternately presented to either a first sample-and-hold member 8 or to a second sample-and-hold member 8' and stored until the next cycle. The output signals from the sample-and-hold members 8, 8' are subtracted in a differencing device 9. The output from this device 9 is the difference between the values of the two successive stored signals from the pick-up-and-hold members 8, 8', and is fed to a trigger circuit 10 having a range of response restricted on both sides, i.e. a window circuit. At the output from this trigger circuit 10 a positive logic signal is emitted if the difference between an integral value and the next succeeding integral value is positive and lies within a predetermined range restricted on both sides. This means that the ohmic resistance is decreasing and the magnitude of the change lies within a range restricted on both sides. A counter 11 ensures that a logic signal appears at the output 12 from the surge arrester P to indicate a power surge only when the trigger circuit 10 emits within a predetermined time, e.g. within one period, two logic signals in succession. The advantage of the solution in accordance with the embodiment of FIG. 1 consists in the fact that the change of the ohmic resistance with time is detected, this change being a quantity which is very characteristic of a power transient.

In the embodiment of FIG. 2 there is employed as the characteristic quantity the change with time of the voltage, multiplied by the cosine of the phase shift between current and voltage. Identically numbered parts in FIG. 2 correspond with those in FIG. 1. The method of operation of the two examples is likewise essentially similar, with the exception that the integrator 6, the rectifier 7 and the divider 14 in FIG. 1 are omitted in FIG. 2. The value of the rectified integral of the voltage signal between two points at which the current passes through zero are detected and stored by the two pick-up-and-hold members 8, 8' directly. This embodiment is structurally simpler and hence cheaper.

We claim:

1. A method of protecting electrical networks in the event of power transients with the use of a surge arrester, comprising the steps of:

continuously monitoring and evaluating the change over time of the impedance of the network, independently of the value of the impedance, with a surge arrester; and actuating a protective relay when a predetermined change is detected in the monitored change within a predetermined time period.

2. The method of claim 1 wherein the change in the ohmic resistance of the network is continuously monitored and evaluated by the surge arrester.

3. A method of protecting electrical networks in the event of power transients with the use of a surge arrester, comprising the steps of:

continuously monitoring and evaluating the change over time of the voltage multiplied by the cosine of the phase shift between the current and the voltage, independently of the value of the impedance, with a surge arrester; and actuating a protective relay when a predetermined change is detected in the monitored change within a predetermined time period.

4. A surge arrester for protecting electrical networks in the event of power transients, comprising:

a square-wave converter for producing a square-wave signal related to the current in the network;

a first integrator for providing an output signal related to the integral of the current in the network;

a second integrator for providing an output signal related to the integral of the voltage of the network;

a control circuit responsive to said square-wave signal for controlling the actuation of said first and second integrators;

means for dividing the rectified output signal of one of said integrators by the rectified output signal of the other integrator;

first and second latch circuits responsive to said control circuit for alternately storing an output signal from said dividing means;

means for determining the difference between the signals stored in said latch circuits;

a trigger circuit for indicating when said difference lies within a predetermined response window; and a counter responsive to said trigger circuit, the output signal from said counter comprising the output signal for the surge arrester.

5. A surge arrester for protecting electrical networks in the event of power transients, comprising:

a square-wave converter for producing a square-wave signal related to the current in the network;

an integrator for providing an output signal related to the integral of the voltage of the network;

a control device responsive to said square-wave signal for controlling the actuation of said integrator;

first and second latch circuits responsive to said control device for alternately storing the output signal from said integrator;

means for determining the difference between the signals stored in said latch circuits;

a trigger circuit for indicating when said difference lies within a predetermined response window; and a counter responsive to said trigger circuit, the output signal from said counter comprising the output signal for the surge arrester.

* * * * *